(12) United States Patent
Wu et al.

(10) Patent No.: US 10,408,965 B2
(45) Date of Patent: Sep. 10, 2019

(54) ADAPTIVE INVERSION FOR VERTICAL RESISTIVITY LOGS FROM MULTIAXIAL INDUCTION MEASUREMENTS

(75) Inventors: Peter T. Wu, Missouri City, TX (US);
Gong Li Wang, Sugar Land, TX (US);
Thomas D. Barber, Houston, TX (US);
Charles A. Johnson, Katy, TX (US)

(73) Assignee: SCHLUMBERGER TECHNOLOGY CORPORATION, Sugar Land, TX (US)

(*) Notice: Subject to any disclaimer, the term of this patent is extended or adjusted under 35 U.S.C. 154(b) by 1225 days.

(21) Appl. No.: 14/343,358

(22) PCT Filed: Sep. 9, 2012

(86) PCT No.: PCT/US2012/054342
§ 371 (c)(1),
(2), (4) Date: Aug. 19, 2014

(87) PCT Pub. No.: WO2013/036896
PCT Pub. Date: Mar. 14, 2013

(65) Prior Publication Data
US 2014/0372040 A1    Dec. 18, 2014

Related U.S. Application Data

(60) Provisional application No. 61/532,602, filed on Sep. 9, 2011.

(51) Int. Cl.
*G01V 3/38* (2006.01)
*E21B 47/12* (2012.01)
*G01V 3/28* (2006.01)

(52) U.S. Cl.
CPC .............. *G01V 3/38* (2013.01); *E21B 47/121* (2013.01); *E21B 47/124* (2013.01); *G01V 3/28* (2013.01)

(58) Field of Classification Search
CPC ... G01V 3/28; G01V 3/38; G01V 3/30; E21B 47/121; E21B 47/124
See application file for complete search history.

(56) References Cited

U.S. PATENT DOCUMENTS

| 8,571,797 B2 | 10/2013 | Wu et al. |
| 2002/0173914 A1 | 11/2002 | Zhang et al. |
| 2005/0274512 A1 | 12/2005 | Tabarovsky et al. |

FOREIGN PATENT DOCUMENTS

| EA | 200700137 A1 | 8/2007 |
| EP | 2113794 A1 | 11/2009 |

(Continued)

OTHER PUBLICATIONS

Nam et al., Simulation of triaxial induction measurements in dipping, invaded, and anisotropic formations using a Fourier series expansion in a nonorthogonal system of coordinates and a self-adaptive hp finite-element method, May-Jun. 2010, Geophysics, vol. 75, No. 3, pp. F83-F95.*

(Continued)

*Primary Examiner* — Sujoy K Kundu
*Assistant Examiner* — L. Anderson
(74) *Attorney, Agent, or Firm* — Sara K. M. Hinkley

(57) ABSTRACT

A method for logging a formation or sample includes obtaining a plurality of multiaxial conductivity measurements from the formation or sample. A horizontal resistivity measurement, a dip measurement and a dip azimuth measurement are derived from the plurality of multiaxial conductivity measurements. A sharp vertical resistivity measurement is derived from a subset of the plurality of multiaxial conductivity measurements.

18 Claims, 20 Drawing Sheets

(56) References Cited

FOREIGN PATENT DOCUMENTS

WO    2011091216 A2    7/2011
WO    2013036509 A1    3/2013

OTHER PUBLICATIONS

Examination Report issued in related GB application GB1404175.0 dated Aug. 9, 2016, 4 pages.
International preliminary report on patentabitlity issued in the related PCT application PCT/US2012/054342, dated Mar. 12, 2014 (4 pages).
Examination report issued in the related GB application 1404175.0, dated Nov. 15, 2016 (4 pages).
International Search Report for International Application No. PCT/US2012/054342 dated Dec. 13, 2012.
Moran, et al. "Effects of Formation Anisotropy on Resistivity-Logging Measurements," Geophysics, vol. 44, No. 7, Jul. 1979, pp. 1266-1286.
Wang, et al. "Triaxial Induction Logging: Theory, Modeling, Inversion, and Interpretation," SPE 103897, Jan. 1, 2006, Society of Petroleum Engineers, pp. 1-19.

\* cited by examiner

- Orthogonal collocated transmitter and receiver coils
- 9 measured components at each tri-axial spacing $$\begin{bmatrix} V_{xx} & V_{xy} & V_{xz} \\ V_{yx} & V_{yy} & V_{yz} \\ V_{zx} & V_{zy} & V_{zz} \end{bmatrix}$$

First subscript - Transmitter orientation
Second subscript - Receiver orientation Model Parameters: Rh, Rv, θ, Φ

ADAPTIVE INVERSION FOR VERTICAL RESISTIVITY LOGS FROM MULTIAXIAL INDUCTION MEASUREMENTS

BACKGROUND

This disclosure relates generally to the field of electrical conductivity measurements of formations made from within wellbores drilled through such formations. More specifically, the disclosure relates to processing multiaxial induction measurements to obtain real-time formation anisotropy and dip information.

Measuring formations properties of a formation from within a wellbore using some conventional 3D triaxial electromagnetic induction tools generally includes measuring 9 component apparent conductivity tensors ($\sigma m(i,j,k)$, $j,k=1,2,3$), at multiple distances between an electromagnetic transmitter and the respective receivers, represented by index i. FIG. 2A illustrates an example arrangement of transmitters and receivers, and shows as a vector the nine component apparent conductivity tensor for one distance (spacing). FIG. 2B shows an arrangement of a transmitter and one receiver on such a triaxial measurement. The typical receiver will include a main receiver and a compensating or "bucking" receiver to cancel effects of direct induction between the transmitter and the main receiver.

The measurements are usually obtained in the frequency domain by operating the transmitter with a continuous wave (CW) of one or more discrete frequencies to enhance the signal-to-noise ratio. However, measurements of the same information content could also be obtained and used from time domain signals through a Fourier decomposition process. This is a well known physics principle of frequency-time duality.

Formation properties, such as horizontal and vertical conductivities ($\sigma h$, $\sigma v$), relative dip angle ($\theta$) and the dip azimuthal direction ($\Phi$), as well as borehole/tool properties, such as mud conductivity ($\sigma mud$), hole diameter (hd), tool eccentering distance (decc), tool eccentering azimuthal angle ($\psi$), all affect these conductivity tensors. FIG. 3A illustrates a top view, and FIG. 3B illustrates an oblique view of an eccentered multiaxial induction tool disposed in a borehole drilled through an anisotropic formation with a dip angle. Using a simplified model of layered anisotropic formation traversed obliquely by a borehole, the response of the conductivity tensors depends on the above 8 parameters ($\sigma h$, $\sigma v$, $\theta$, $\Phi$, $\sigma mud$, hd, decc, $\psi$) in a very complicated manner. The effects of the borehole/tool to the measured conductivity tensors may be very big even in oil base mud (OBM) environment. Through an inversion technique, the above borehole/formation parameters can be calculated and the borehole effects can be removed from the measured conductivity tensor. In FIGS. 3A and 3B, X and Z are axes of the coordinate system fixed on the borehole, the Y axis is perpendicular to X an Z is in the direction into the paper (right-hand-rule) $\theta$ and $\Phi$ are the relative dip and dip azimuth of the formation, respectively, decc is the tool eccentering distance and $\psi$ is the azimuth of eccentering.

After the borehole correction, the borehole corrected measurements may be further processed with a simplified model which does not contain a borehole. For example, one may use a simple model of uniform anisotropic formation with arbitrary dip angle with respect to the tool as illustrated in top view in FIG. 4A and in oblique view in FIG. 4B. The foregoing model can be called a zero-dimensional (ZD) model because the model formation does not have variation in the axial and radial direction of the tool. Example implementations of the ZD model are described in more detail in International Patent Application Publication No. WO2011/091216, the contents of which are hereby incorporated by reference in their entirely. In the ZD model, the controlling parameters are formation horizontal (Rh) and vertical (Rv) resistivities, the relative dip angle ($\theta$) and the dip azimuth angle ($\Phi$). In actual well logging conditions, the foregoing formation properties are generally unknown. Given the unknown parameters in such environment, the simple ZD model is actually the most versatile processing model to be used to generate coarse estimates of formation properties over the wellbore (borehole) path. These coarse Rh, Rv, dip, and azimuth values (presented with respect to depth, called a "log") could be used to define zones where other higher order model inversion is applicable. For example, 1D inversion (e.g., Wang et al, "Triaxial Induction Logging, Theory, Modeling, Inversion, and Interpretation" SPE 103897, 2006, incorporated herein by reference) is appropriate to improve the vertical resolution of the Rh and Rv logs over a zone where Rh and Rv are varying but the dip and azimuth are almost constant.

Before multiaxial induction tools were invented, most of the induction tools only used axial coils or ZZ coils (coils with magnetic moment directed along the axial direction, or Z coordinate direction, of the tool) for the measurement. Such a ZZ coil tool could effectively measure only horizontal resistivity in a vertical well through horizontally layered formations, or any combination of well inclination and formation dip where the tool axis was perpendicular to the bedding planes). For many hydrocarbon bearing zones, the condition of vertical wells through horizontally layered formations is not common. The formations usually are characterized by Rh, Rv, dip, and azimuth of the layers. The apparent conductivity tensor measured by the triaxial induction tool is sensitive to the above formation parameters. Various inversion techniques, such as axial ZD and 1D inversion (e.g., Wang et al, "Triaxial Induction Logging, Theory, Modeling, Inversion, and Interpretation" SPE 103897, 2006, incorporated herein by reference), have been developed to solve for the formation parameters from the triaxial measurements. The axial 1D inversion model allows layered anisotropic formations to have different Rh and Rv values for each layer. However, the axial 1D inversion model requires the dip and azimuth of all the anisotropic layers within the processing window to be the same. If those assumed model conditions actually exist, the axial 1D inversion could produce higher resolution Rh and Rv logs in each layer than those from ZD inversion. The results are free from adjacent layer ("shoulder bed") effects.

Under actual well logging condition, the dip and azimuth of the formations are generally not well known and may be highly variable. If one applies axial 1D inversion indiscriminately, there is no effective way to discern whether the axial 1D model assumptions are met or not. Therefore, the validity of the resultant logs becomes questionable.

Through extensive study using model data and real logs, it is apparent that the Rh, dip, and azimuth logs from ZD inversions have a reasonably good vertical response, while the Rv log is often distinctly has poorer vertical response compared with Rh, dip, and azimuth logs. Consequently, the ZD's Rv log often misses the true Rv value of thin beds of thickness of 1 to several feet.

More specifically, the logs from RADAR processing, e.g., conventional inversion processing, which is a mark of the assignee of the present invention, currently used in tools such as the RT SCANNER tool, which is also a mark belonging to the assignee of the present disclosure, and as described more fully in International Application Publication No. WO2011/091216, hereby incorporated by reference) or ZD processing show that most of the formations encountered in the oil field are 3D formations. Inversions using a 3D formation model are a method to obtain accurate logs in 3D formations. However, at this time, 3D inversion is still very time consuming and not practically available for oil field applications. The Rh, dip, and azimuth logs from RADAR processing or ZD processing generally have good vertical response in 3D formations because of the small radius of the influence sphere which is of order of the transmitter-to-receiver spacing. Due to the inherently lower sensitivity, the Rv log, however, shows distinctly poorer vertical resolution then the Rh, dip, and azimuth logs. Depending on the resistivity contrast between adjacent beds and the bed thicknesses, some significant shoulder bed effects may exist. These shoulder bed effects may cause the Rv logs from RADAR processing or ZD processing to incorrectly indicate resistivity of thin beds, particularly those of thickness from 1 ft to 5 ft. For beds thinner than 1 ft, the logs from RADAR processing or ZD processing may return values representing those of the bulk anisotropy properties of the thinly laminated formation. For beds thicker than 5 ft, such processing usually can resolve the correct bed resistivity value at the center of the bed. The lack of vertical resolution of the Rv log significantly limits the accuracy of the net hydrocarbon volume in place prediction over such thin beds.

Accordingly, there is a need in the art for methods and systems for obtaining and processing downhole conductivity measurements that overcome one or more of the deficiencies that exist with conventional methods.

SUMMARY

A method for logging a formation or sample includes obtaining a plurality of multiaxial conductivity measurements from the formation or sample. A horizontal resistivity measurement, a dip measurement and a dip azimuth measurement are derived from the plurality of multiaxial conductivity measurements. A sharp vertical resistivity measurement is derived from a subset of the plurality of multiaxial conductivity measurements.

DETAILED DESCRIPTION

The present disclosure describes systems and methods for logging a formation by using an adaptive inversion method using a selected subset of conductivity tensor measurements and ZD inversion results for Rh, Rv, dip, and azimuth to derive a shaper (higher resolution) Rv log. The sharper Rv log will generally be closer to true formation Rv for thin beds than the measurements from conventional ZD inversion.

Figure 1:
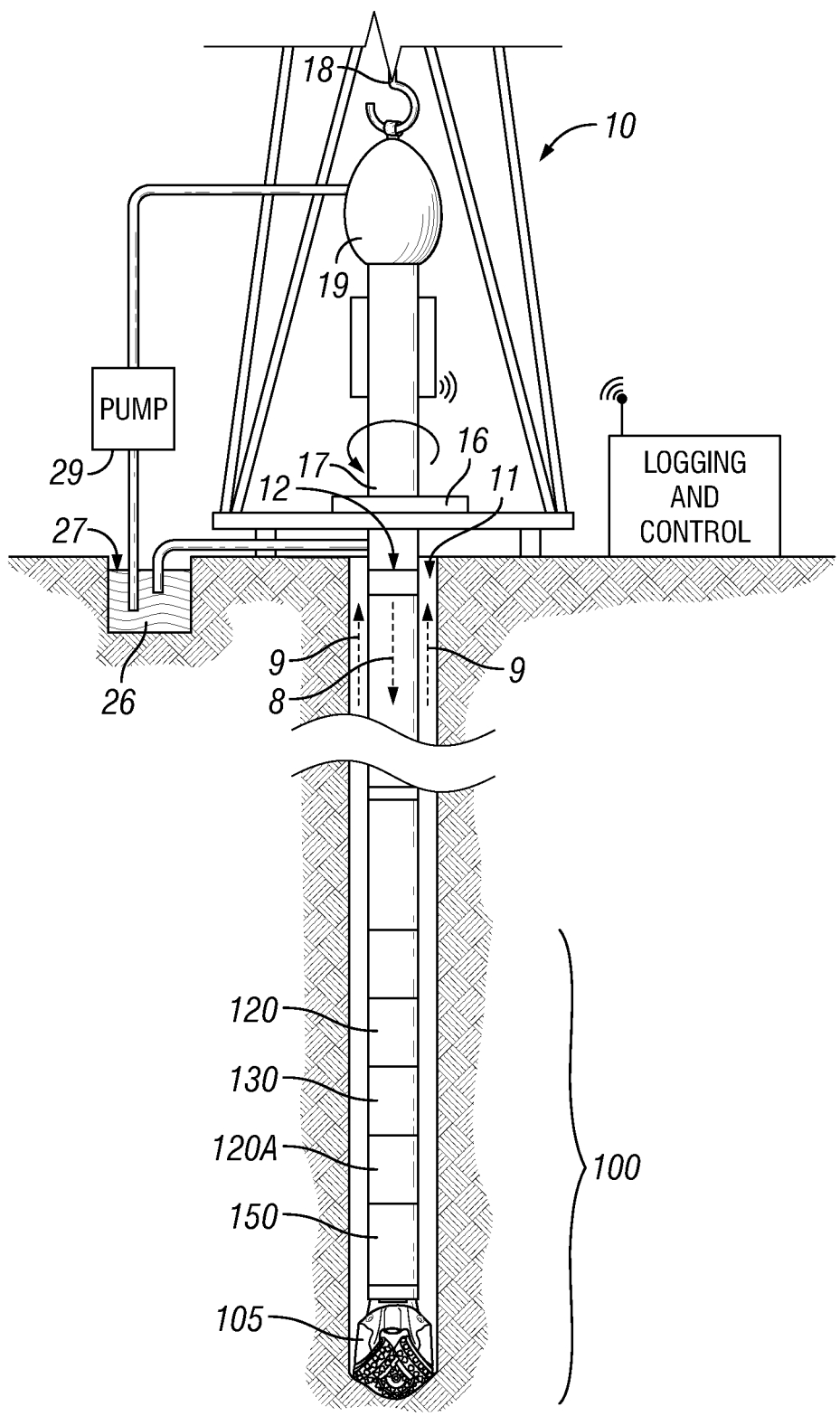
FIG. 1 shows an example wellsite measurement system.

FIG. 1 illustrates a wellsite system in which the present example can be used. The wellsite can be onshore or offshore. In this example system, a borehole 11 is formed in subsurface formations by rotary drilling in a manner that is well known. Other examples can also use directional drilling, as will be described hereinafter.

A drill string 12 is suspended within the borehole 11 and has a bottom hole assembly 100 which includes a drill bit 105 at its lower end. The surface system includes platform and derrick assembly 10 positioned over the borehole 11, the assembly 10 including a rotary table 16, kelly 17, hook 18 and rotary swivel 19. The drill string 12 is rotated by the rotary table 16, energized by means not shown, which engages the kelly 17 at the upper end of the drill string. The drill string 12 is suspended from a hook 18, attached to a traveling block (also not shown), through the kelly 17 and a rotary swivel 19 which permits rotation of the drill string relative to the hook. As is well known, a top drive system could alternatively be used.

In the present example, the surface system further includes drilling fluid or mud 26 stored in a pit 27 formed at the well site. A pump 29 delivers the drilling fluid 26 to the interior of the drill string 12 via a port in the swivel 19, causing the drilling fluid to flow downwardly through the drill string 12 as indicated by the directional arrow 8. The drilling fluid exits the drill string 12 via ports in the drill bit 105, and then circulates upwardly through the annulus region between the outside of the drill string and the wall of the borehole, as indicated by the directional arrows 9. In this well known manner, the drilling fluid lubricates the drill bit 105 and carries formation cuttings up to the surface as it is returned to the pit 27 for recirculation.

The bottom hole assembly 100 of the illustrated embodiment a logging-while-drilling (LWD) module 120, a measuring-while-drilling (MWD) module 130, a rotary-steerable directional drilling system and motor, and drill bit 105.

The LWD module 120 may be housed in a special type of drill collar, as is known in the art, and may contain one or a plurality of known types of logging tools. It will also be understood that more than one LWD and/or MWD module can be employed, e.g. as represented at 120A. (References, throughout, to a module at the position of 120 can alternatively mean a module at the position of 120A as well.) The LWD module includes capabilities for measuring, processing, and storing information, as well as for communicating with the surface equipment. In the present embodiment, the LWD module includes a directional resistivity measuring device.

The MWD module 130 is also housed in a special type of drill collar, as is known in the art, and can contain one or more devices for measuring characteristics of the drill string and drill bit. The MWD tool further includes an apparatus (not shown) for generating electrical power to the downhole system. This may typically include a mud turbine generator powered by the flow of the drilling fluid, it being understood that other power and/or battery systems may be employed. In the present embodiment, the MWD module includes one or more of the following types of measuring devices: a weight-on-bit measuring device, a torque measuring device, a vibration measuring device, a shock measuring device, a stick slip measuring device, a direction measuring device, and an inclination measuring device.

Although FIG. 1 shows example components of a wellsite system that includes a drill string and LWD and MWD modules, the various aspects of the present disclosure can apply equally to various other types of wellsite systems. For example, the disclosure could apply to tools and toolstrings conveyed by wireline, drill pipe, wired drill pipe, and/or coiled tubing drill, or other methods of conveyance known in the art.

As discussed above, measurements made by induction tools are generally input into an inversion process. Various aspects of example methods for inverting and otherwise processing the conductivity-related measurements obtained by induction tools are discussed herein. For example, methods and systems are provided herein for improving the vertical resolution of the Rv log using the existing Rh, dip, and azimuth logs and an adaptive inversion algorithm designed to exploit the Rv-sensitive components of the conductivity tensor.

Figures 2A, 2B:
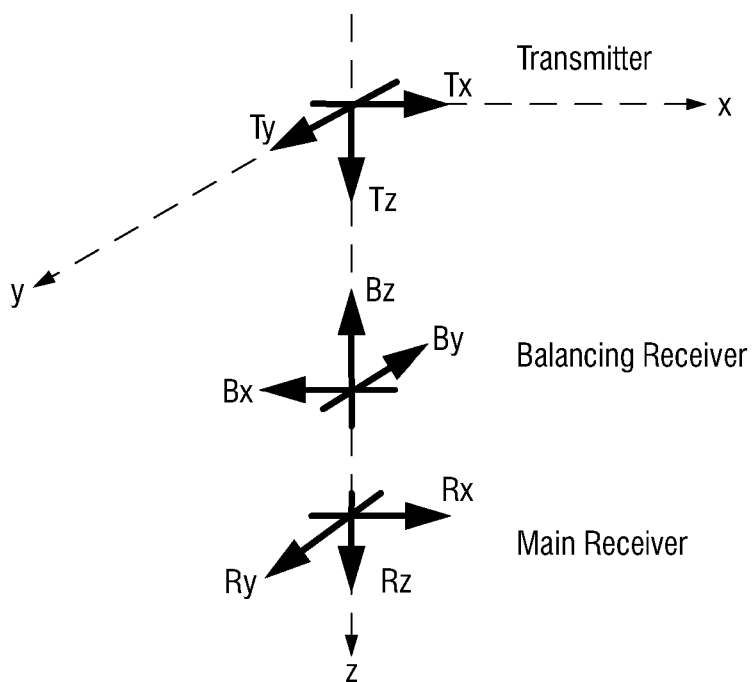
FIGS. 2A and 2B show, respectively, an explanation of a multiaxial resistivity tensor and an example triaxial transmitter and receiver arrangement.
Figure 3A:
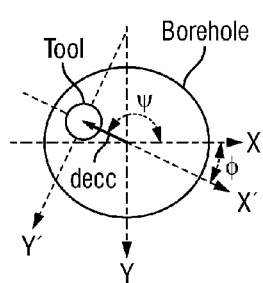
FIGS. 3A and 3B show a well logging instrument eccentered in a wellbore in top view and oblique view, respectively.
Figure 3B:
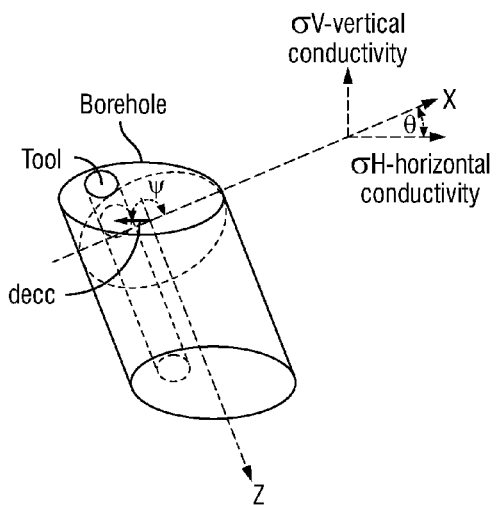
Figure 4A:
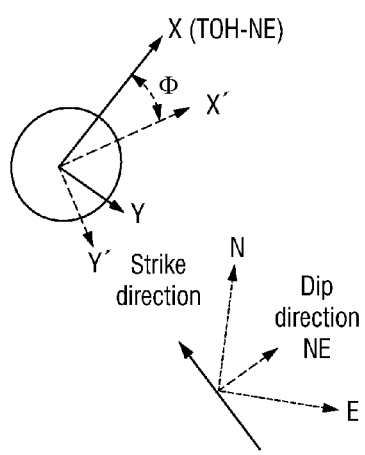
FIGS. 4A and 4B show a well logging instrument eccentered in a wellbore in top view and oblique view, respectively to demonstrate results of zero-D modeling.
Figure 4B:
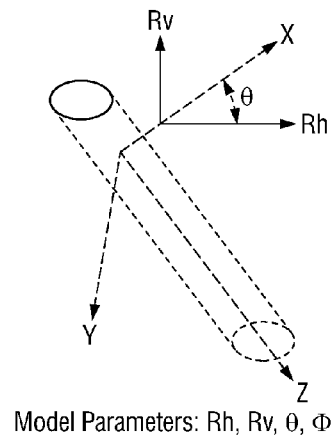

In example embodiments, the RADAR processing or ZD processing or other higher resolution processing can be performed using data measured from various triaxial spacings. While the present example is directed to triaxial induction well logging tools, wherein the transmitter and receivers consist of mutually orthogonal dipole antennas, with one antenna generally parallel to the instrument's longitudinal axis, it is to be clearly understood that other example processes may be derived for instruments having other than triaxial dipole antennas. It is only necessary to have a sufficient number of such antennas such that the apparent conductivity tensors described with reference to FIGS. 2A and 2B can be derived. It should also be understood that the term "dip" as used herein may mean relative inclination of formation layers with respect to a plane normal to the longitudinal (Z) axis of the well logging tool. In actual well logging conditions, as explained above, the trajectory of the wellbore may not be vertical, so that "dip" becomes a relative term. Such relative dip may be resolved into actual formation geodetic dip and azimuth by determining the geodetic orientation of the well logging instrument using directional sensors (therein or in adjacent instruments) and well known survey calculation methods.

In a thick, homogeneous, non-permeable formation, conventional uniform formation models generally fit the data and the resulting computed well logs are generally accurate. Over formations having thin beds, the results generally may not be as accurate due to the mismatch between the model and data. In such case, the Rv parameter, to which the measurements have the least sensitivity, also shows the greatest shoulder bed effects. Extensive modeling studies show that if the model is constrained with the existing Rh, dip, and azimuth logs (from RADAR processing or ZD processing) and adaptively use only a subset of the conductivity tensor as inputs which have the most sensitivity to Rv parameter, a sharper Rv may be obtained than from RADAR processing and ZD processing.

Figure 5:
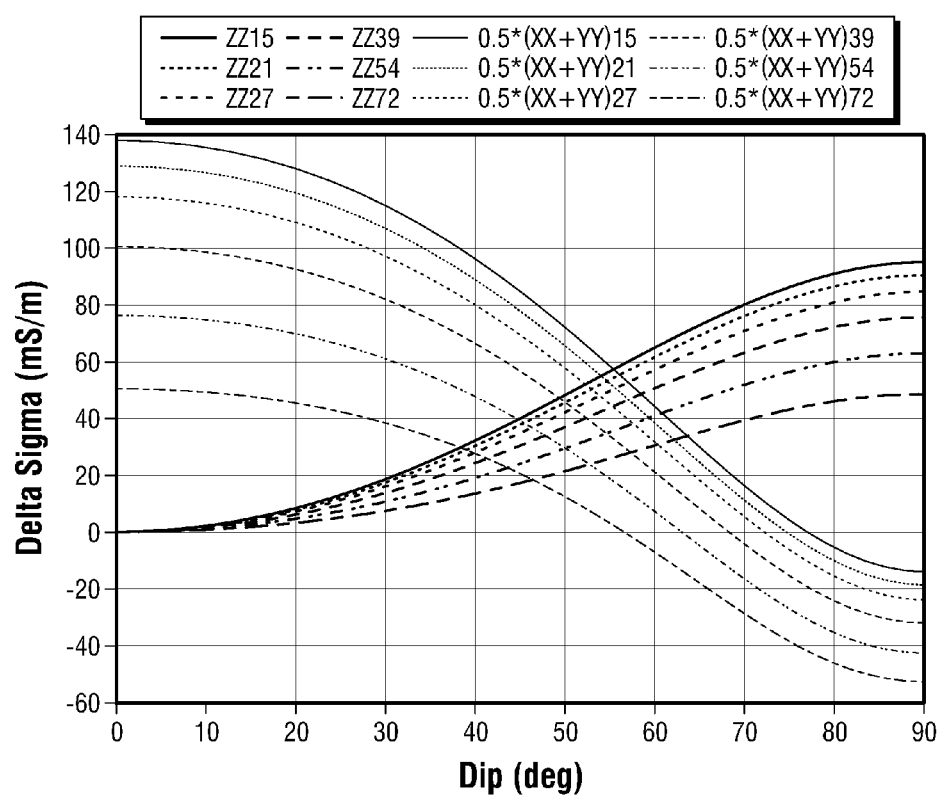
FIG. 5 shows a graph of sensitivity of the ZZ, and average XX and YY conductivity tensors with respect to apparent dip for various transmitter to receiver distances.

In one example, a sensitivity analysis may be be performed. FIG. 5 shows a plot of the change in ZZ and the average XX and YY [0.5*(XX+YY)] components of the conductivity tensor with respect to dip angle and Rv varies from 1.5 to 2 ohm-m in a uniform anisotropic formation with Rh=1 ohm-m, and a dip azimuth of 45 degrees. There are 5 solid curves each representing a ZZ component, and 5 dashed curves representing corresponding 0.5*(XX+YY) components for different transmitter-to-receiver spacings. The spacings range from 15 in. to 72 in. and are shown in the graph in FIG. 5 as the numerical suffix for each curve label.

FIG. 5 shows that the ZZ component is relatively insensitive to Rv at low dip angle and the sensitivity increases as dip increases. The 0.5*(XX+YY) component exhibits an opposite trend in Rv sensitivity. The 0.5*(XX+YY) component shows maximum sensitivity at zero dip, and sensitivity decreases as dip increases. In some examples, the 0.5*(XX+YY) component can be used because it is less dependent on the azimuth angle than simply using XX or YY component alone. However, in other examples, the XX or YY component, or other combinations of the two, can be used.

In example implementations, there may be four independent parameters, Rh, Rv, dip, and azimuth describing the formation as is the case in RADAR processing and ZD inversion processing. If the higher vertical resolution parameters Rh, dip, and azimuth from RADAR processing or ZD processing are used to constrain the inversion model and adaptively use the higher sensitivity component (ZZ or 0.5*(XX+YY)) to solve for Rv, a more stable and higher resolution Rv is likely to result. Model data explained below illustrate this point.

Figure 6:
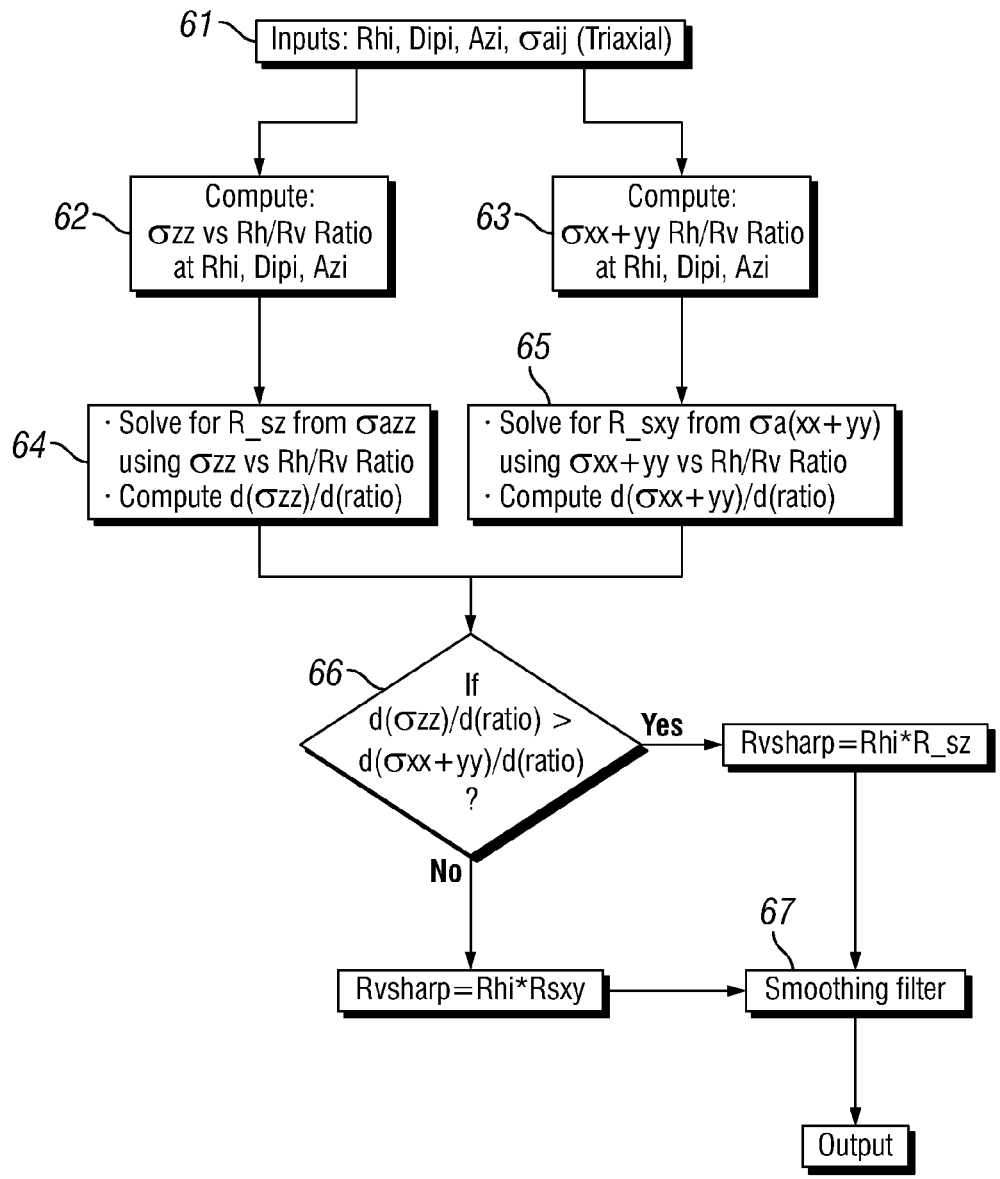
FIG. 6 shows a flow chart of an example process for obtaining higher resolution Rv values.

In some examples, such an adaptive inversion algorithm for a sharper Rv is provided. FIG. 6 shows a flow diagram for an example adaptive inversion algorithm for sharper Rv. Input data may include the measured apparent conductivity tensors for a plurality of spacings, and at 61, RADAR processing or ZD inversion may provide estimates of Rh, dip, and azimuth (Rhi, Dipi and Azi) and the borehole corrected apparent conductivity tensor from the example triaxial induction tool, $\sigma_{aij}$. Here the subscripts i and j take on x, y, and z values to denote the x, y, and z component, respectively.

Using a uniform anisotropic formation model, at 62, a theoretical σzz value as a function of Rv/Rh ratio (Ratio=Rv/Rh) may be computed over a set of grid points covering a selected range of possible Rv/Rh values. In the foregoing computation, model parameters Rh, dip, and azimuth are fixed at Rhi, Dipi, and Azi, respectively. Only the Rv, which is expressed as Rv=Rhi*Ratio, varies over the prescribed Ratio grid points.

Similarly, the $\sigma_{xx+yy}$ which is defined as:

$$\sigma_{xx+yy}=0.5*(\sigma_{xx}+\sigma_{yy})$$

may be calculated, at 63, over the same ratio grids. Again, other combinations are possible for σxx and σyy. At 64, using the borehole corrected $\sigma_{azz}$ measurement and the theoretical σzz versus Ratio data obtained at 62, a sharp Rv/Rh ratio can be determined from a zz component, R_sz, as well as the derivative of σzz with respective to the Ratio as a sensitivity indicator. Similarly, at 65, the borehole corrected $\sigma_{a(xx+yy)}$ measurement and the theoretical $\sigma_{xx+yy}$ versus Ratio data obtained from 63 can be used to solve for another sharp Rv/Rh ratio from the xx and yy component, R_sxy. From the foregoing, the derivative of $\sigma_{xx+yy}$ with respective to Ratio can be computed as a sensitivity indicator. In the present example, the $\sigma_{a(xx+yy)}$ measurement is defined as $$\sigma_{a(xx+yy)}=0.5*(\sigma_{axx}+\sigma_{ayy}).$$

The results from 64 and 65 then can, at 66, have the sensitivity from the zz component, $d(\sigma zz)/d(ratio)$, compared with the sensitivity from the xx+yy component, $d(\sigma_{xx+yy})/d(ratio)$. If the sensitivity from the zz component is higher, i.e., if $d(\sigma zz)/d(ratio)>d(\sigma_{xx+yy})d/(ratio)$, the SharpRv will be assigned as SharpRv=Rhi*R_sz; otherwise it will be assigned as SharpRv=Rhi*R_sxy.

In the present example, the process elements at 62 through 66 can be repeated for data at every measured depth frame and the results of SharpRv at each depth frame may be accumulated at 67, wherein a smoothing filter may be applied to smooth out occasional high frequency noise spikes (which are a natural occurrence, such as, e.g., borehole rugosity, and do not represent defects in the measurement)

Model data examples of the foregoing are provided herein. As an initial matter, it is important to point out that the adaptive inversion algorithm presented herein still uses the uniform anisotropic formation model. Therefore with uniform anisotropic formation model data, the resultant Rvsharp will be almost identical to the Rvi obtained from RADAR processing or ZD inversion. Minute differences may be due to numerical truncations encountered during the processing.

With the uniform anisotropic formation model, the present example method cannot produce sharper Rv for any arbitrary 3D formations. However, the present example generally will produce similar or better results than those obtained from RADAR processing or ZD processing. Under conditions of small Rh contrast between beds and/or high dip, the present example method may produce better Rv data than those from RADAR processing or ZD processing. Following are illustrations of the performance of the present example method through a series of modeled formation data.

Figure 7:
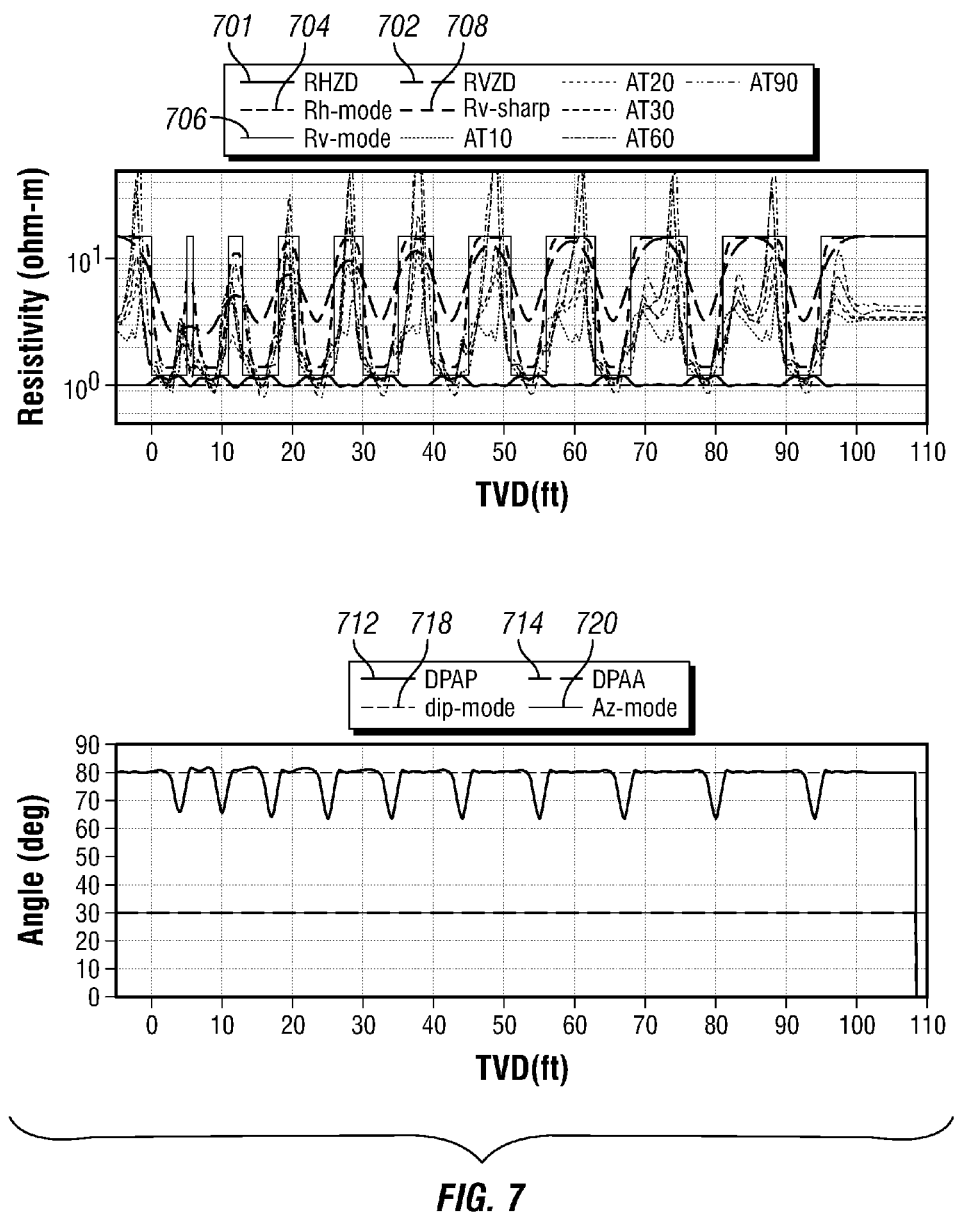
FIGS. 7 through 15 show various modeled examples of output of a process according to the flow chart in FIG. 6.

1D Chirp beds without Rh contrast and high dip (80 deg.). FIG. 7 shows the results from a 1D model of a "chirp" bed sequence with bed thickness ranging from 1 ft to 9 ft., with a 1 ft. thickness increment. The background formation properties are Rh=1 ohm-m, Rv=1.2 ohm-m, dip=80 deg., and azimuth=30 degrees. The thin bed formation properties are Rh=1 ohm-m, Rv=15 ohm-m, dip=80 deg., and azimuth=30 degrees. A thin bed of increasing thickness is inserted into the background formation every 5 ft.

On the topmost track in FIG. 7, the ZD inversion processing Rh and Rv (RHZD and RVZD) values are plotted as solid lines 701 and 702, respectively. The model parameter Rh and Rv values are dashed lines 704, 706, respectively. For reference purpose, the 2-ft resolution AIT (ZZ coil array induction tool) curves, AT10 through AT90 are shown as thin dashed lines. The SharpRv log from the adaptive inversion algorithm is plotted as curve 708. On the bottom track, the ZD inverted apparent dip and azimuth (DPAP and DPAA) are lines 712 and 714, respectively. The model parameter of dip and azimuth are in dashed lines 718 and 720, (Note: 718 and 720 are missing on the figure) respectively. Although not specifically identified by reference numerals the following 1D and 3D model examples in FIGS. 8 through 15 have the same curve notation (e.g., with reference to dots, dashes, line thicknesses and any ancillary symbols placed on the curve.

The example (a) in FIG. 7 demonstrated that the SharpRv is much closer to the thin bed Rv value than that obtained from RVZD. The improvement is the most prominent in the 1 ft bed where the RVZD shows little response to the change in Rv while the SharpRv clearly shows a sharp peak with peak value close but not quite reaching the modeled Rv in the 1 ft bed. The difference between SharpRv and RVZD gradually decreases as the thickness of the bed increases. Near each bed boundary, the SharpRv curve clearly demonstrate sharper response than RVZD. As expected, over the thick layer such as 100-110 ft area, the SharpRv and RVZD are the overlaying each other with indistinguishable difference.

Figure 8:
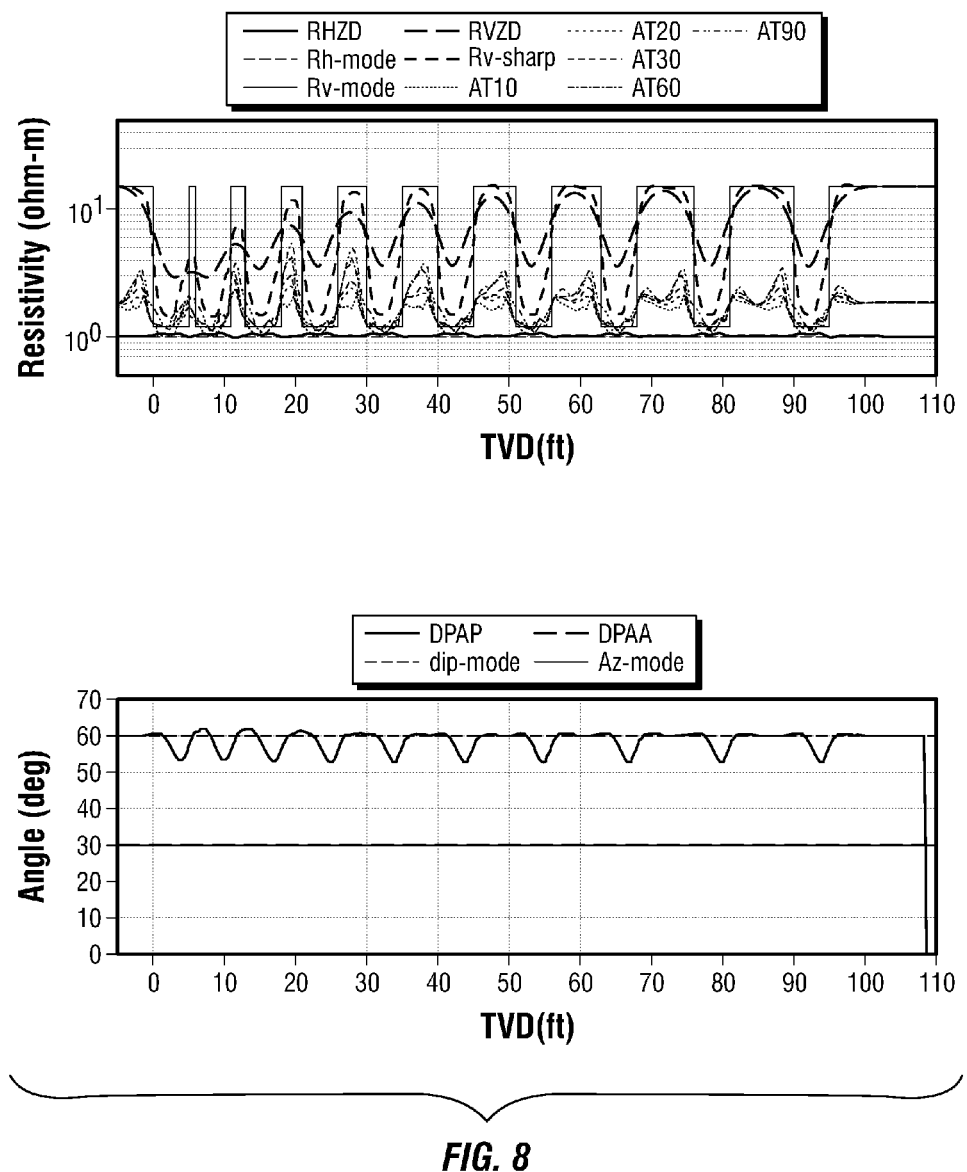

The example (b) in FIG. 8 shows the results from a 1D model of a chirp bed sequence without Rh contrast and medium dip. The resistivities of the beds in the sequence are the same as that in example (a) except the dip angle changes from 80 to 60 degrees. This example also shows very significant improvement of SharpRv over the RVZD, particularly over the 1 to 2 ft bed area.

Figure 9:
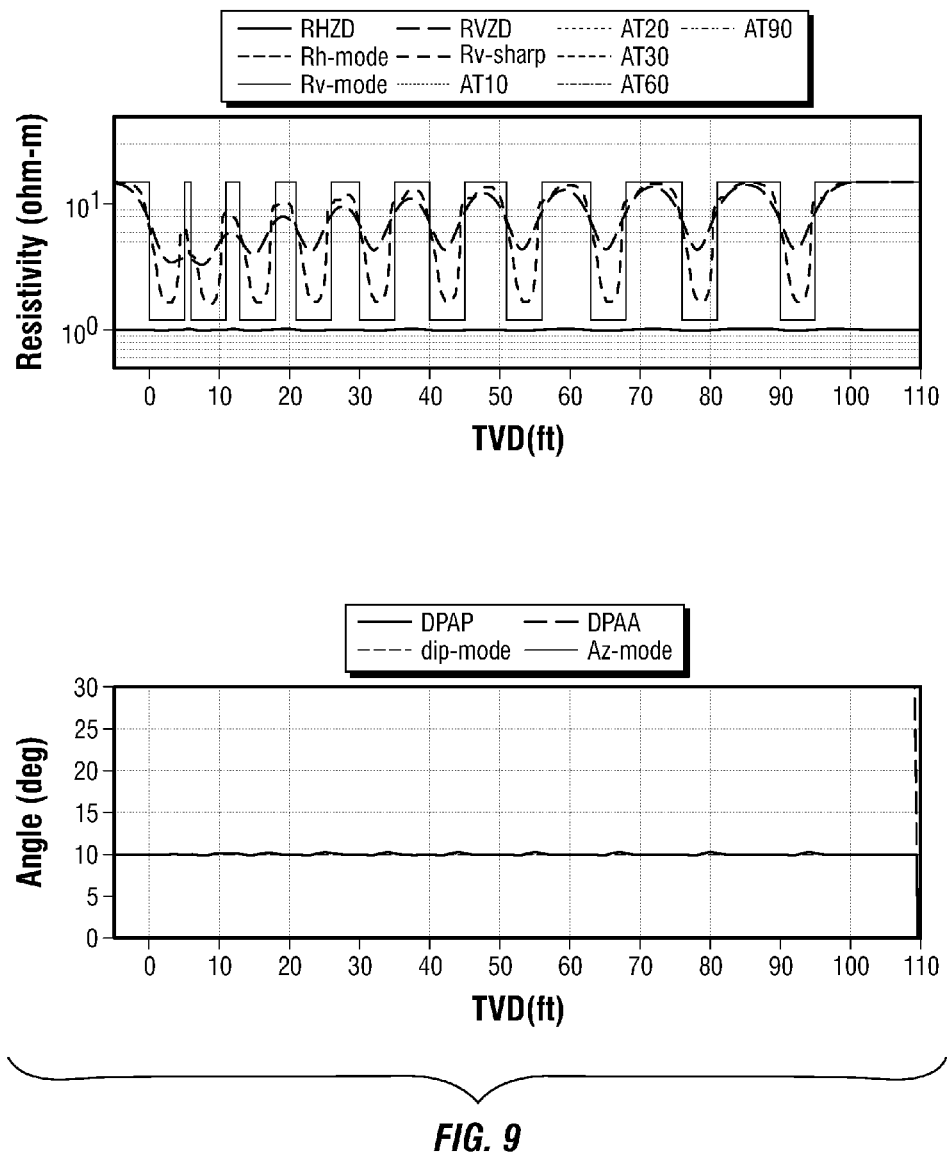

The example (c) in FIG. 9 shows the results from a 1D model of a chirp bed sequence without Rh contrast and low dip. The resistivities of the beds in the sequence are the same as that in example (a) except the dip angle changes from 80 to 10 degrees. This low dip angle example also shows very significant improvement of SharpRv over the RVZD, particularly over the 1 to 2 ft bed area. Examples (a) through (c) in FIGS. 7 through 9 demonstrated that without Rh contrast the SharpRv always has significant improvement over RVZD regardless of dip angle.

Figure 10:
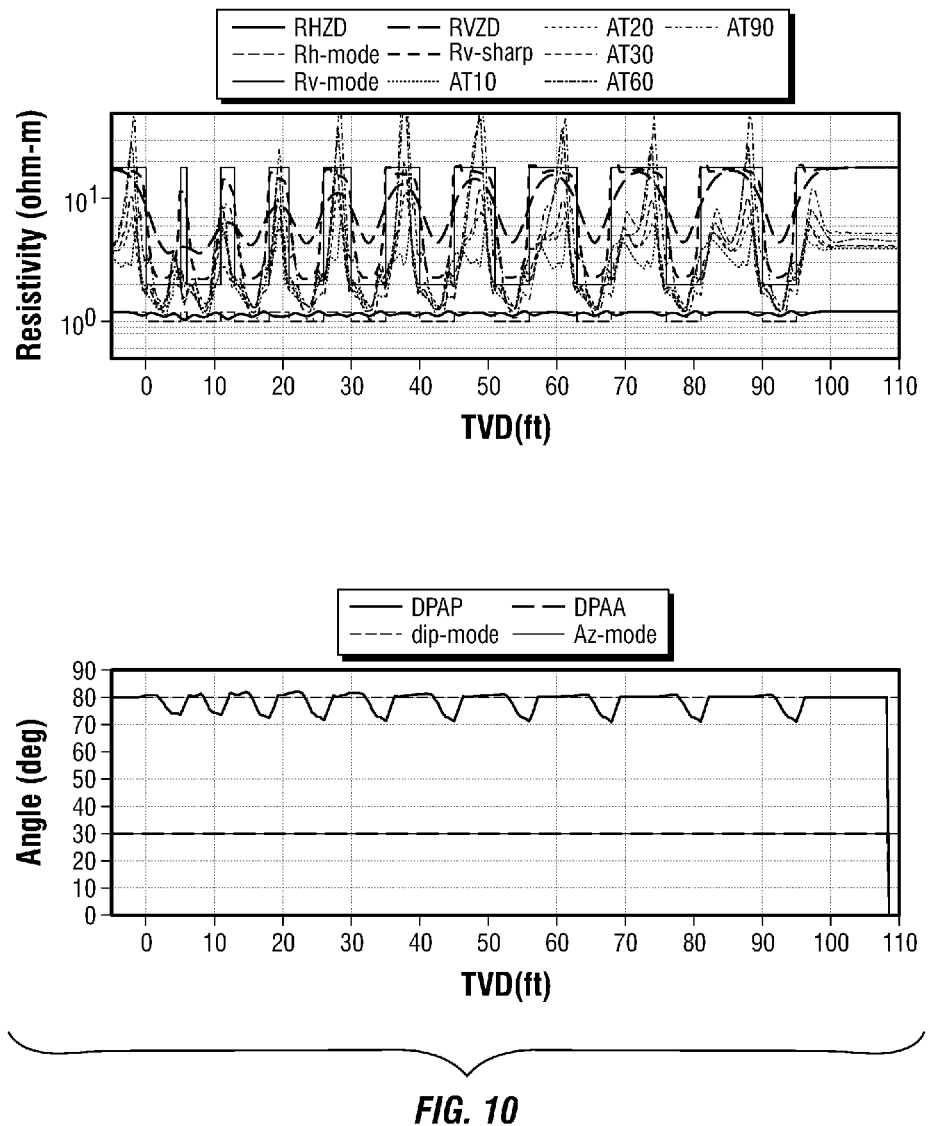

The example (d) in FIG. 10 shows the results from a 1D model of a chirp bed sequence with low Rh contrast and high dip. The same thickness chirp beds as example (a) are used in this example but the resistivities of the beds are different. The background formation properties are Rh=1 ohm-m, Rv=2 ohm-m, dip=80 deg., and azimuth=30 degree. The thin bed formation properties are Rh=1.2 ohm-m, Rv=18 ohm-m, dip=80 deg., and azimuth=30 degree.

This low Rh contrast high dip angle example also shows very significant improvement of SharpRv over the RVZD similar to the no Rh contrast case (a).

Figure 11:
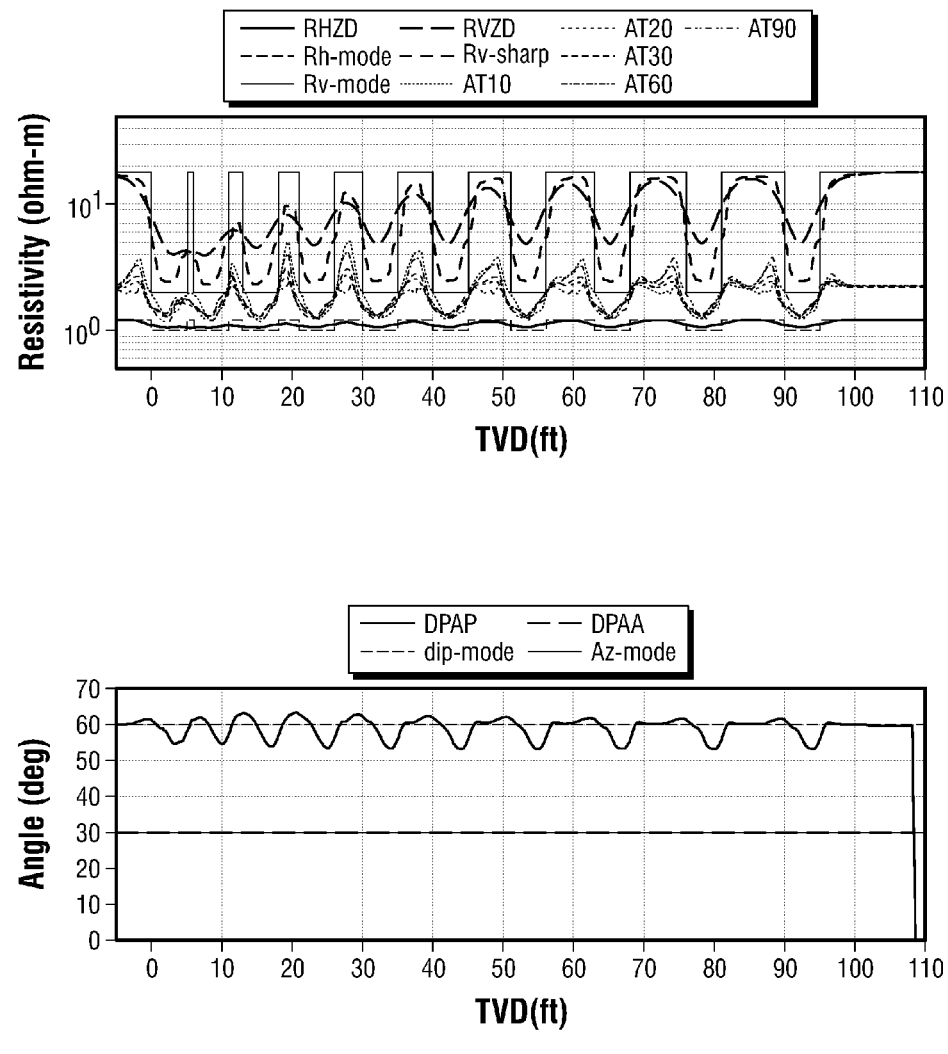

FIG. 11 shows the results from a 1D model of a chirp bed sequence with low Rh contrast and medium dip. The resistivities of the beds in the sequence are the same as that in example (d) except the dip angle changes from 80 to 60 degrees.

This low Rh contrast medium dip angle example also shows very significant improvement of SharpRv over the RVZD. As the dip angle decreases, the sharpness of the SharpRv curve reduces slightly.

Figure 12:
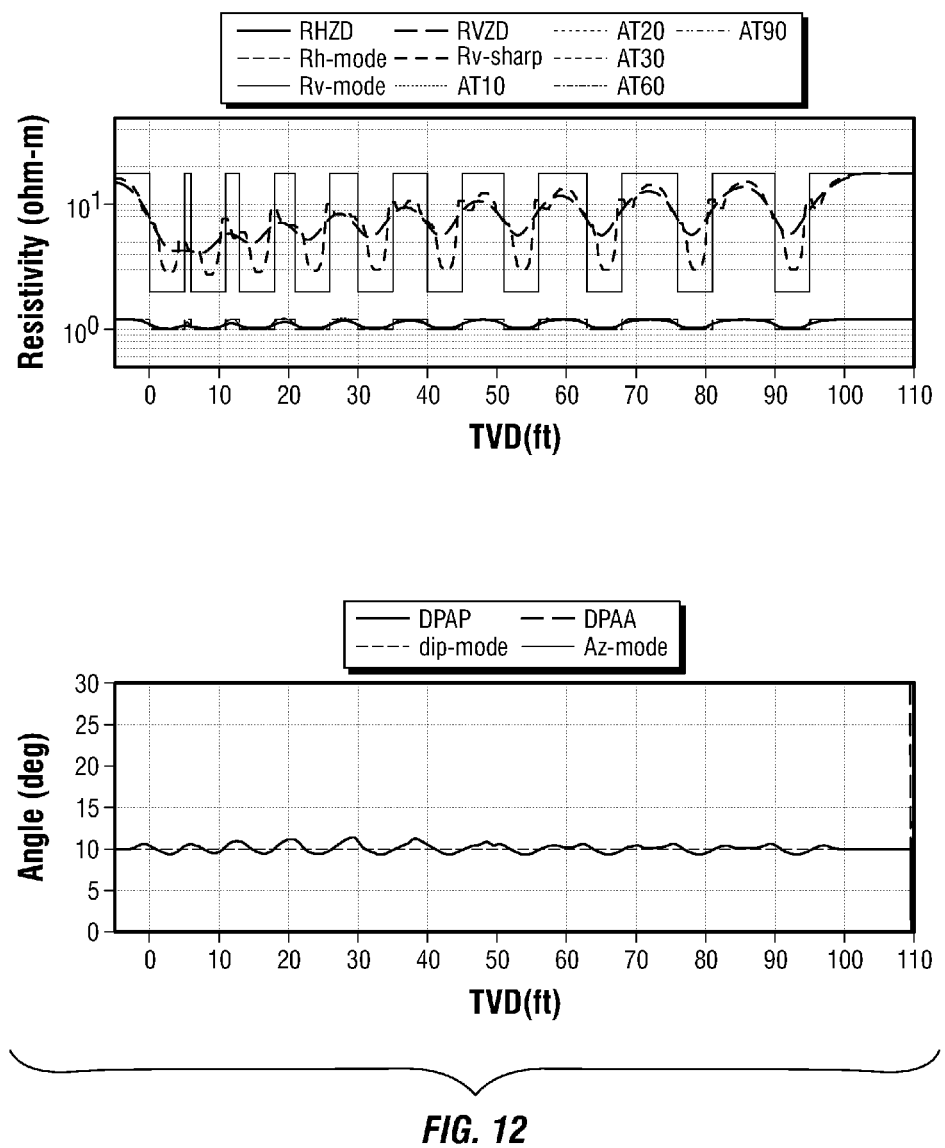

FIG. 12 shows the results from a 1D model of a chirp bed sequence with low Rh contrast and low dip. The resistivities of the beds in the sequence are the same as that in example (d) except the dip angle changes from 80 to 10 degrees.

This low Rh contrast low dip angle example also shows very significant improvement of SharpRv over the RVZD. However at low dip angle, the sharpness of the SharpRv curve reduces further. There is extra wiggle on SharpRv appears near the bed boundaries instead of a smooth transition. Most of the improvement are in the 5 ft background layers where SharpRv are much closer to the true Rv than RVZD.

Figure 13:
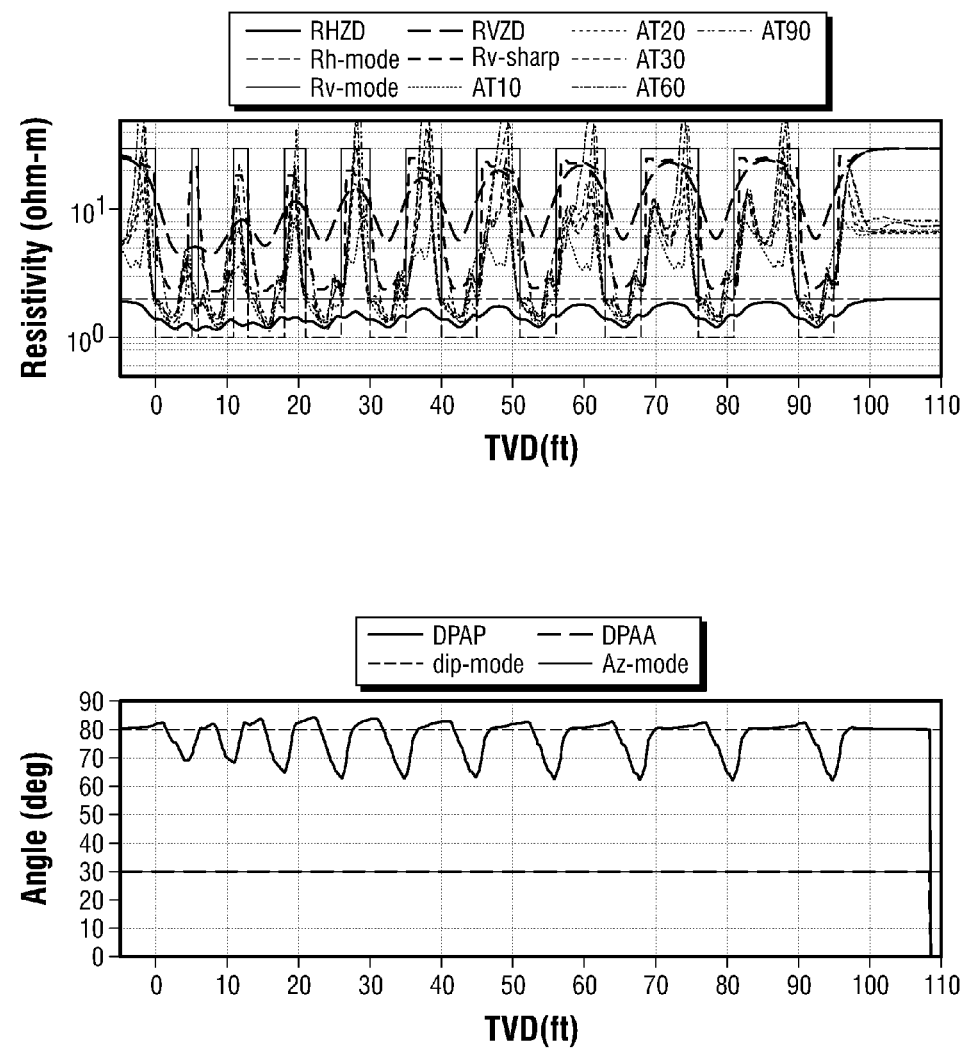

FIG. 13 shows the results from a 1D model of a chirp bed sequence with high Rh contrast and high dip. The same thickness chirp beds as example (a) are used in this example but the resistivities of the beds are different. The background formation properties are Rh=1 ohm-m, Rv=2 ohm-m, dip=80 deg., and azimuth=30 degree. The thin bed formation properties are Rh=2 ohm-m, Rv=30 ohm-m, dip=80 deg., and azimuth=30 degree.

This high Rh contrast high dip angle example also shows very significant improvement of SharpRv over the RVZD similar to the no Rh contrast case (a). This example together with examples (a) and (d) seem to suggest that in high dip formations, the SharpRv log will have significant improvement over RVZD regardless whether there is the significant Rh contrast or not.

Figure 14:
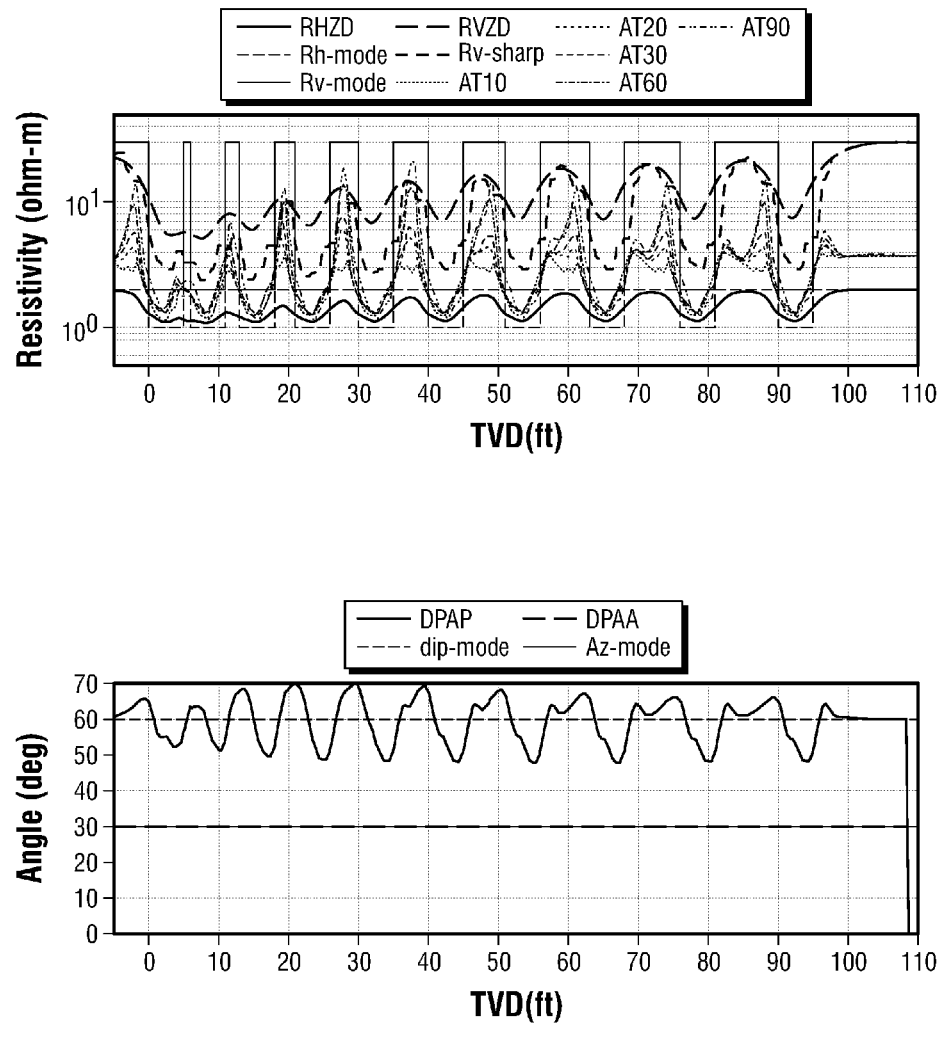

FIG. 14 shows the results from a 1D model of a chirp bed sequence with high Rh contrast and medium dip. The resistivities of the beds in the sequence are the same as that in example (g) except the dip angle changes from 80 to 60 degrees.

This high Rh contrast medium dip angle example also shows that SharpRv performs slightly better than RVZD. The improvements are mostly over the background layers.

Figure 15:
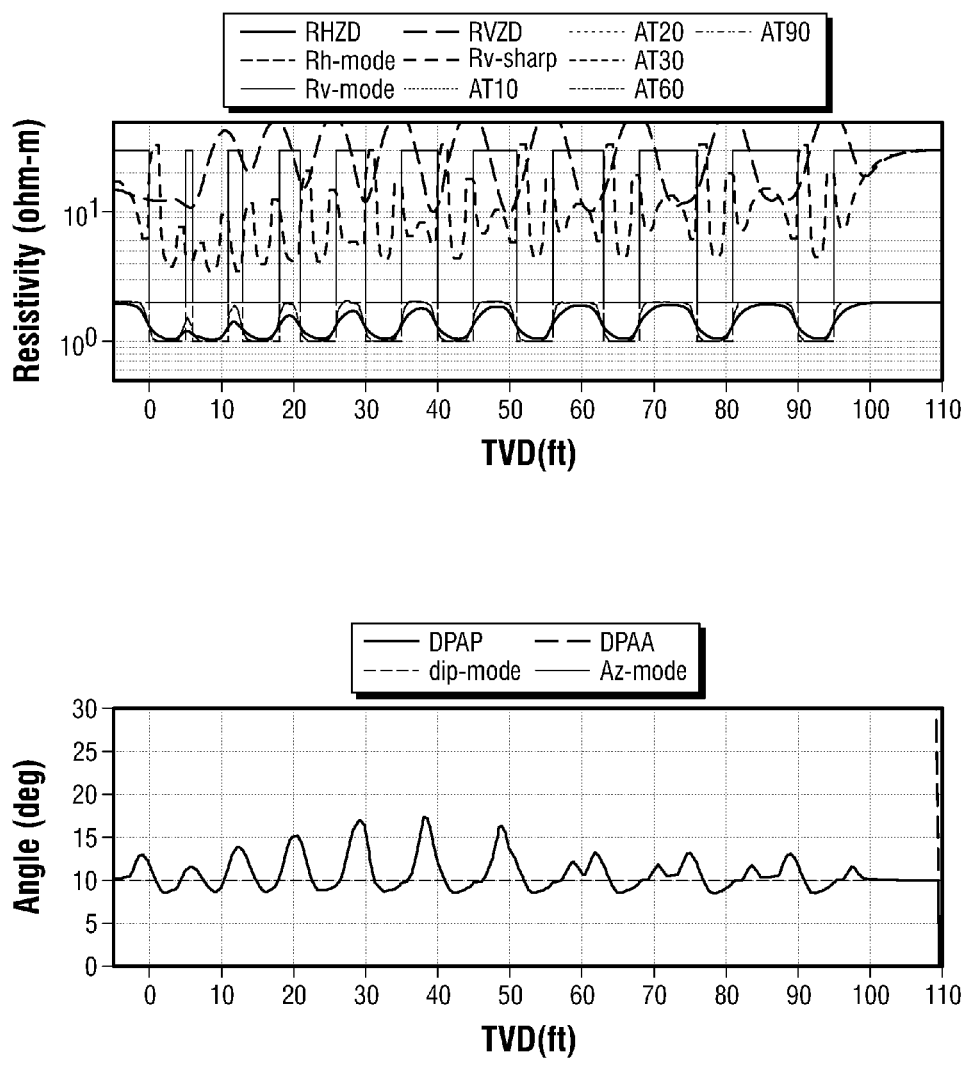

FIG. 15 shows the results from a 1D model of a chirp bed sequence with high Rh contrast and low dip. The resistivities of the beds in the sequence are the same as that in example (g) except the dip angle changes from 80 to 10 degrees.

This high Rh contrast low dip angle example—shows that both SharpRv and RVZD are doing poorly. The extra wiggle on SharpRv appears near the bed boundaries become much more pronounced than case (f) for low Rh contrast and low dip. The only improvement perhaps are in the 5 ft background layers where SharpRv are closer to the true Rv than RVZD.

In summary, the 1D model data cases in FIGS. 7 through 15 map out the area where the SharpRv may has strong improvement over RVZD. Generally, SharpRv provides significant improvement in vertical response over zone where Rh contrast is low or relative dip (DPAP) is high. For conditions other than that, the performance of the SharpRv is about the same as RVZD.

In the next few model data examples, the performance of SharpRv in 3D formations will be examined.

Figure 16:
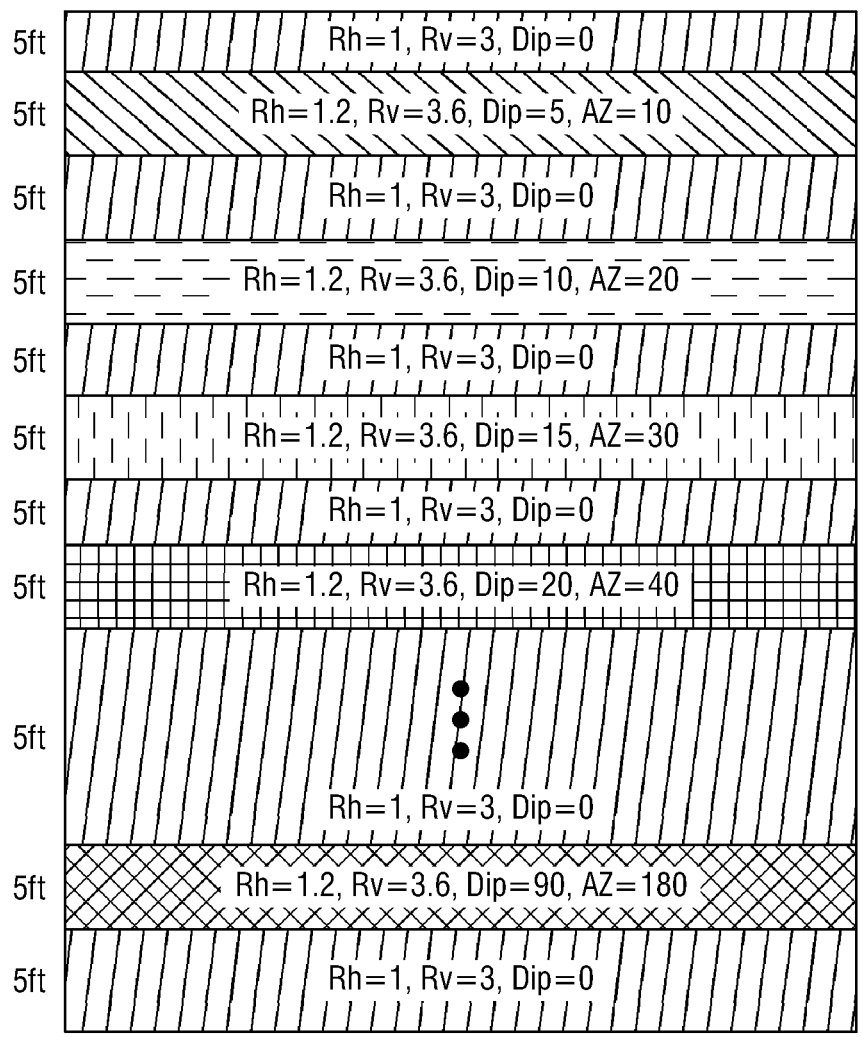
FIG. 16 shows an example layered formation model used to test the process shown in FIG. 6.

FIG. 16 is a model of a 5 ft bed sequence with increasing dip and azimuth successively. A 3D finite-difference code may be used to generate synthetic data for the bed sequence described in FIG. 16. The background formation of this bed sequence is anisotropic, with $R_h$=1 ohm-m, $R_v$=3 ohm-m, and dip=zero. Every other 5 ft, a 5-ft-thick bed of the same $R_h$ and $R_v$ values but with different dip and azimuth is inserted into the background formation. The dip magnitudes of the 18 inserted beds vary from 5° to 90° in steps of 5°. The azimuths of the inserted beds vary from 10° to 180° in steps of 10 degrees.

Figure 17:
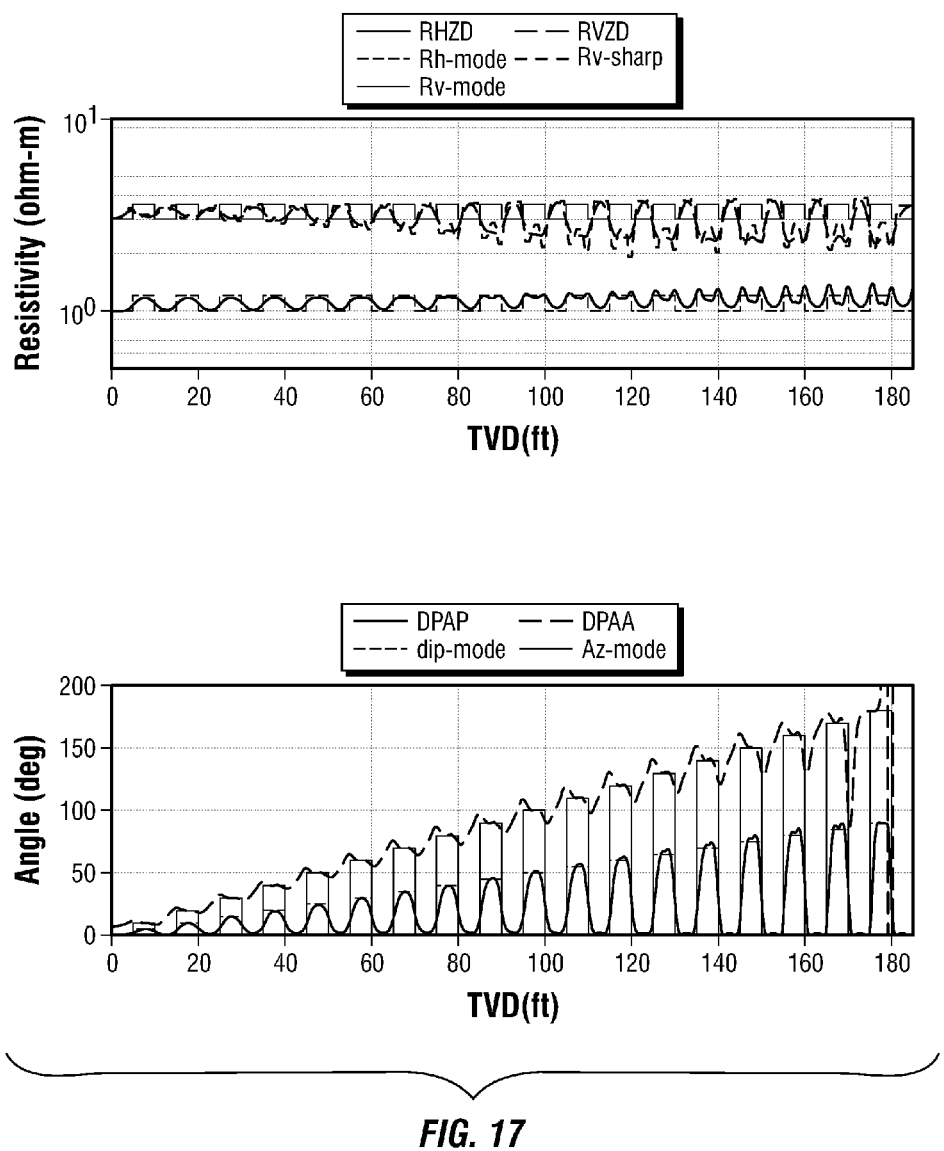
FIGS. 17 through 20 show results of the process described with reference to FIG. 6 performed on the model of FIG. 6 for various formation dip conditions.

These synthetic data may be processed by ZD inversion and then adaptive inversion for SharpRv. The output logs are shown in FIG. 17. The RHZD reproduces the model parameter well for low dip magnitude, thin beds. Small horns in the upward (higher resistivity) direction start appear at the bed boundaries for beds with dip magnitude higher than 40° (beds deeper than 80 ft). These horns may be caused by the 3D effect, which is not accounted for in the inversion model. The 3D effect on the RVZD log is much more severe compared with the RHZD log. It causes the RVZD log to have downward horns at the bed boundaries. The RVZD log usually has a much longer range bed boundary effect or poorer vertical resolution than the RHZD log. Therefore, the downward horns from the two adjacent bed boundaries are merged together such that the RVZD log for the 5-ft zero-dip background zone appears to be at a lower resistivity value. Consequently, the overall shape of the RVZD log also appears to be out of phase with the RHZD log. The ZD performs beautifully in obtaining very good dip and azimuth log in this 3D formations.

The SharpRv log is very similar to the RVZD log in the lower dip angle formations (TVD<80 ft). In high dip formations (TVD>80 ft), the value of the SharpRv at the center of the bed is actually much closer to the model value than is the RVZD curve. Curve coding for identification will be the same in FIGS. 18-20 as it is in FIG. 17.

Figure 18:
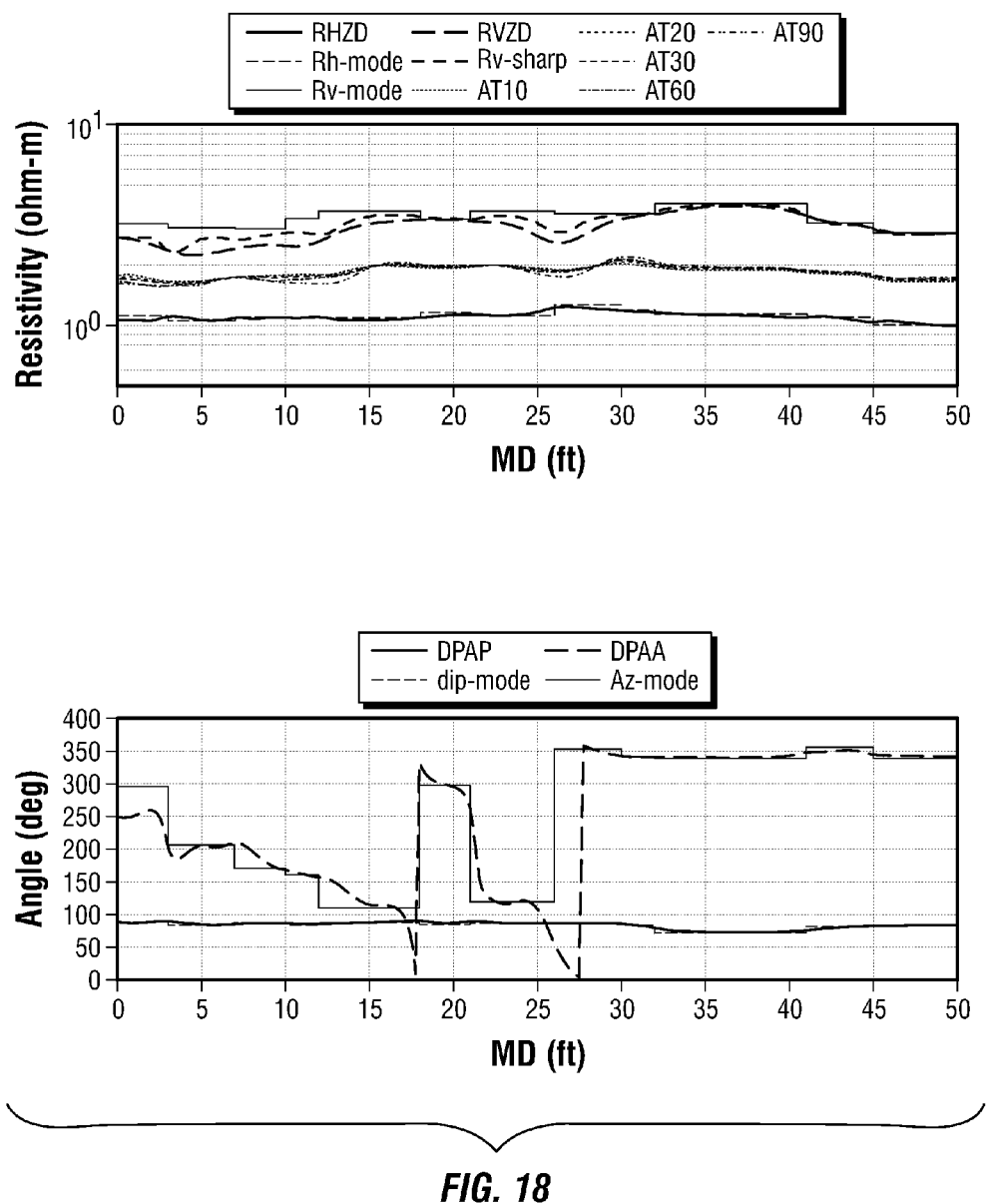

FIG. 18 shows the results from a 3D model data simulating a high dip field condition. The SharpRv log in this 3D high dip formation example is closer to the model Rv value than RVZD over several layers, such as 5-17 ft and 22-27 ft zones.

Figure 19:
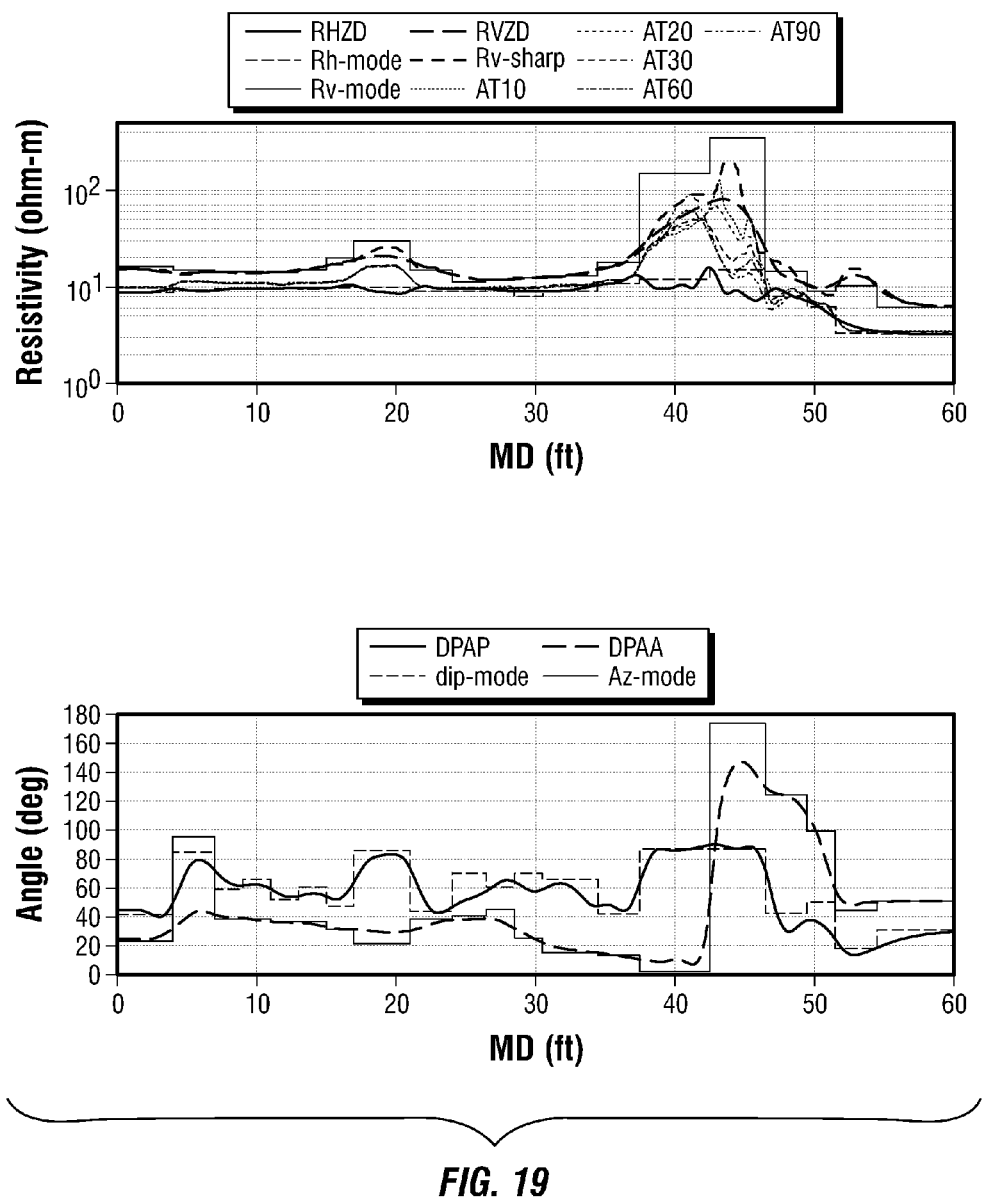

FIG. 19 shows the results from a 3D model data simulating a variable dip field condition. The SharpRv log in this 3D formation example is similar to RVZD over lower dip layers and closer to the model Rv over the high dip layer (39-46 ft zone).

Figure 20:
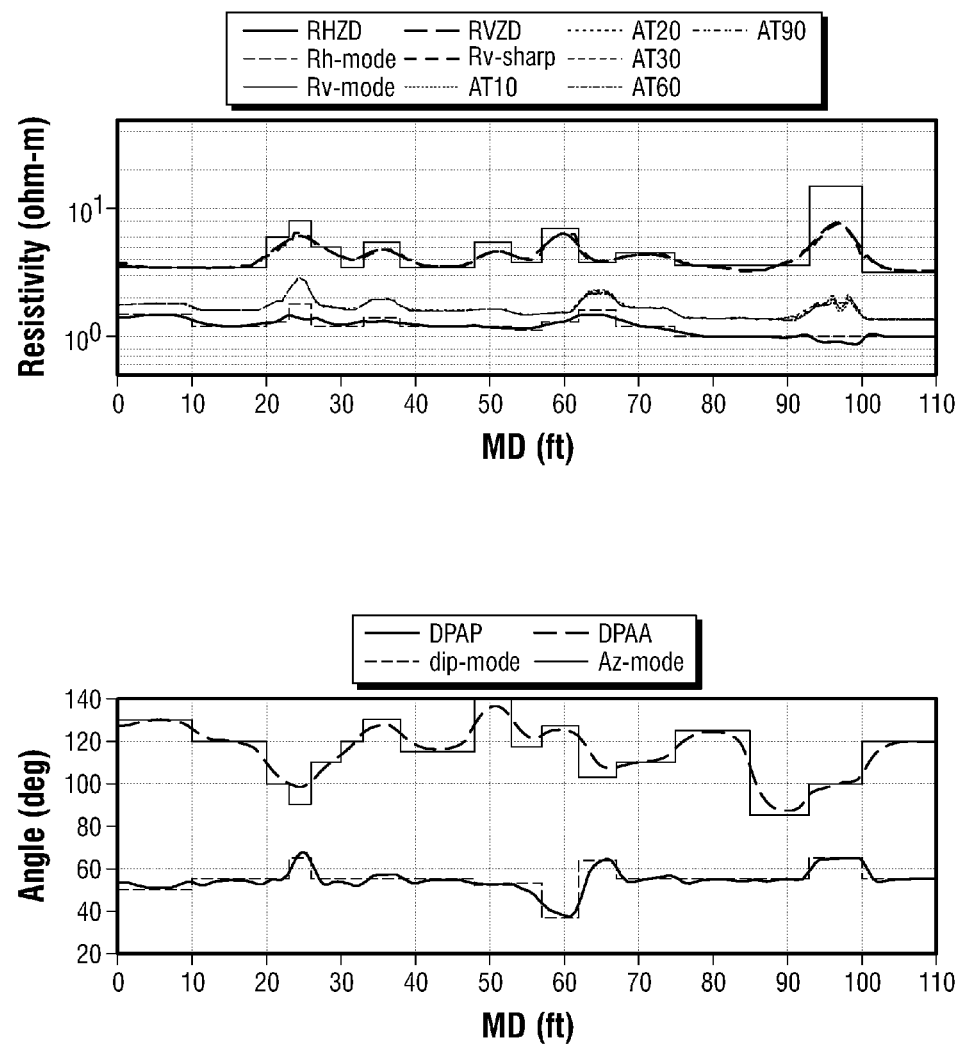

FIG. 20 shows the results from a 3D model data simulating a medium dip field condition where the dip of the formation varies between 40 to 60 degrees. The SharpRv log in this 3D formation example is nearly the same as RVZD.

The characters of the model RHZD, RVZD, AIT and SharpRv logs match very well with those from the field logs. Specifically, the model RVZD is very lazy and reading substantially higher than the SharpRv log over the thin bed area. The SharpRv log delineates the bed boundary well and the center bed reading is much closer to the model parameter than that from RVZD.

Figure 21:
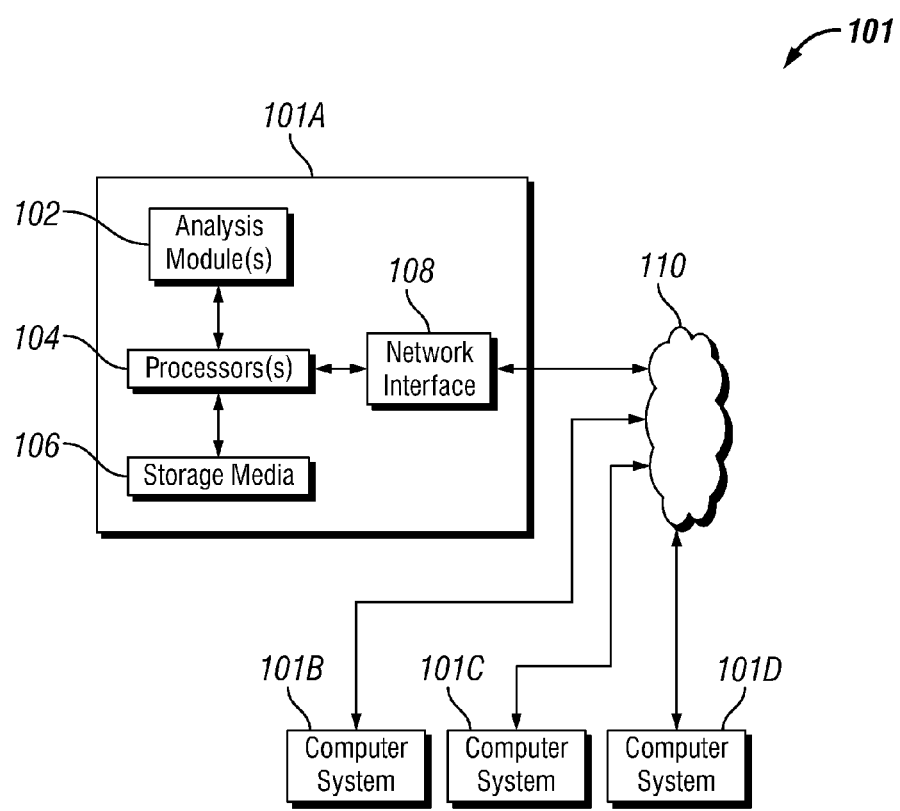
FIG. 21 shows an example computing system in accordance with some embodiments for carrying out example methods in the current disclosure.

FIG. 21 shows an example computing system 101 in accordance with some embodiments for carrying out example methods such as those explained above. The computing system 101 can be an individual computer system 101A or an arrangement of distributed computer systems. The computer system 101A includes one or more analysis modules 102 that are configured to perform various tasks according to some embodiments, such as the tasks depicted in FIG. 6. To perform these various tasks, an analysis module 102 executes independently, or in coordination with, one or more processors 104, which may be connected to one or more storage media 106. The processor(s) 104 may also connected to a network interface 108 to allow the computer system 101A to communicate over a data network 110 with one or more additional computer systems and/or computing systems, such as 101B, 101C, and/or 101D (note that computer systems 101B, 101C and/or 101D may or may not share the same architecture as computer system 101A, and may be located in different physical locations, e.g. computer systems 101A and 101B may be on a ship underway on the ocean, in a well logging unit disposed proximate a wellbore drilling, while in communication with one or more computer systems such as 101C and/or 101D that are located in one or more data centers on shore, other ships, and/or located in varying countries on different continents).

A processor can include a microprocessor, microcontroller, processor module or subsystem, programmable integrated circuit, programmable gate array, or another control or computing device.

The storage media 106 can be implemented as one or more non-transitory computer-readable or machine-readable storage media. Note that while in the example embodiment of FIG. 21 storage media 106 is depicted as within computer system 101A, in some embodiments, storage media 106 may be distributed within and/or across multiple internal and/or external enclosures of computing system 101A and/or additional computing systems. Storage media 106 may include one or more different forms of memory including semiconductor memory devices such as dynamic or static random access memories (DRAMs or SRAMs), erasable and programmable read-only memories (EPROMs), electrically erasable and programmable read-only memories (EEPROMs) and flash memories; magnetic disks such as fixed, floppy and removable disks; other magnetic media including tape; optical media such as compact disks (CDs) or digital video disks (DVDs); or other types of storage devices. Note that the instructions discussed above can be provided on one computer-readable or machine-readable storage medium, or alternatively, can be provided on multiple computer-readable or machine-readable storage media distributed in a large system having possibly plural nodes. Such computer-readable or machine-readable storage medium or media is (are) considered to be part of an article (or article of manufacture). An article or article of manufacture can refer to any manufactured single component or multiple components. The storage medium or media can be located either in the machine running the machine-readable instructions, or located at a remote site from which machine-readable instructions can be downloaded over a network for execution.

It should be appreciated that computing system 101 is only one example of a computing system, and that computing system 100 may have more or fewer components than shown, may combine additional components not depicted in the embodiment of FIG. 21, and/or computing system 101 may have a different configuration or arrangement of the components depicted in FIG. 21. The various components shown in FIG. 21 may be implemented in hardware, software, or a combination of both hardware and software, including one or more signal processing and/or application specific integrated circuits.

Further, the acts in the methods described above may be implemented by running one or more functional modules in information processing apparatus such as general purpose processors or application specific chips, such as ASICs, FPGAs, PLDs, or other appropriate devices. These modules, combinations of these modules, and/or their combination with general hardware are all included within the scope of protection of the invention.

While the invention has been described with respect to a limited number of embodiments, those skilled in the art, having benefit of this disclosure, will appreciate that other embodiments can be devised which do not depart from the scope of the invention as disclosed herein. Accordingly, the scope of the invention should be limited only by the attached claims.

What is claimed is:

1. A method for logging a formation or sample comprising:
    deploying a logging tool into the formation or sample;
    obtaining a plurality of multiaxial conductivity measurements by the logging tool from the formation or sample;
    in a processor, deriving, from the plurality of multiaxial conductivity measurements, a horizontal resistivity measurement, a dip measurement, and an azimuth measurement; and
    in a processor, deriving a sharp vertical resistivity measurement from the derived horizontal resistivity measurement, the dip measurement, the azimuth measurement, and a conductivity tensor value.

2. The method of claim 1, wherein the horizontal resistivity measurement, dip measurement, and azimuth measurement are derived through inversion using a zero-dimensional model performed in a processor.

3. The method of claim 1, wherein the plurality of multiaxial conductivity measurements comprise the conductivity tensor value, wherein the conductivity tensor value is selected based at least in part on having a selected sensitivity to vertical resistivity.

4. The method of claim 1, wherein the multiaxial conductivity measurements are obtained by a triaxial logging tool comprising at least one triaxial transmitter and at least one triaxial receiver, and wherein the conductivity tensor value comprises a conductivity measurement between each coil of the at least one triaxial transmitter and each coil of the at least one triaxial receiver.

5. The method of claim 4, wherein the conductivity tensor comprises measurements $\sigma_{xx}$, $\sigma_{xy}$, $\sigma_{xz}$, $\sigma_{yx}$, $\sigma_{yy}$, $\sigma_{yz}$, $\sigma_{zx}$, $\sigma_{zy}$, and $\sigma_{zz}$, wherein $\sigma$ represents an apparent conductivity and each subscript thereof represents a dipole axis of the at least one transmitter and a dipole axis of the at least one receiver, respectively.

6. The method of claim 5, wherein deriving the sharp vertical resistivity measurement comprises:
    in a processor computing the measurement $\sigma_{zz}$ as a function of a ratio (Rv/Rh) indicative of a relationship between vertical resistivity (Rv) and horizontal resistivity (Rh) over a selected set of points, thereby yielding a $\sigma_{zz}$ function varying based on the vertical resistivity (Rv) and fixed at the horizontal resistivity measurement, the dip measurement, and the azimuth measurement; and
    in a processor computing the measurement $\sigma_{xx+yy}$ as a function of the ratio (Rv/Rh) over the selected set of points, thereby yielding a $\sigma_{xx+yy}$ function also varying based on the vertical resistivity (Rv) and fixed at the horizontal resistivity measurement, the dip measurement, and the azimuth measurement.

7. The method of claim 6, wherein the measurement $\sigma_{zz}$ and the measurement $\sigma_{xx+yy}$ are computed in a processor using a uniform anisotropic formation model.

8. The method of claim 7, wherein deriving the sharp vertical resistivity measurement further comprises:
    in a processor, in response to a sensitivity of the measurement $\sigma_{zz}$ being greater than a sensitivity of the measurement $\sigma_{xx+yy}$, computing the sharp vertical resistivity measurement using the $\sigma_{zz}$ function; and
    in a processor, in response to the sensitivity of the measurement $\sigma_{zz}$ being less than or equal to the sensitivity of the measurement $\sigma_{xx+yy}$, computing the sharp vertical resistivity measurement using the $\sigma_{xx+yy}$ function.

9. The method of claim 8, wherein deriving the sharp vertical resistivity measurement further comprises:
    in a processor computing a derivative of the measurement $\sigma_{zz}$ with respect to the ratio (Rv/Rh) as a derivative of the measurement $\sigma_{zz}$ with respect to the ratio (Rv/Rh) over the set of points; and
    in a processor computing a derivative of the measurement $\sigma_{xx+yy}$ with respect to the ratio (Rv/Rh) as a derivative of the measurement $\sigma_{xx+yy}$ with respect to the ratio (Rv/Rh) over the set of points.

10. The method of claim 9, wherein deriving the sharp vertical resistivity measurement further comprises comparing a derivative of the measurement $\sigma_{zz}$ with respect to the ratio (Rv/Rh) with a derivative of the measurement $\sigma_{xx+yy}$ with respect to the ratio (Rv/Rh) in a processor.

11. The method of claim 10, wherein deriving the sharp vertical resistivity measurement further comprises:
    selecting as the sharp vertical resistivity measurement the z-sharpened vertical resistivity ratio times the horizontal resistivity measurement in response to a determination in the processor that the derivative of the measurement $\sigma_{zz}$ with respect to the ratio (Rv/Rh) exceeds the derivative of the measurement $\sigma_{xx+yy}$ with respect to the ratio (Rv/Rh) [d($\sigma_{zz}$)/d(Rv/Rh) exceeds d($\sigma_{xx+yy}$)/d(Rv/Rh)]; and selecting as the sharp vertical resistivity measurement the xy-sharpened vertical resistivity ratio times the horizontal resistivity measurement in response to a determination that d($\sigma_{xx+yy}$)/d(Rv/Rh) exceeds d($\sigma_{zz}$)/d(Rv/Rh).

12. A system for logging a formation or sample comprising:
   a logging tool for obtaining a plurality of multiaxial conductivity measurements from the formation or sample; and
   one or more processors for deriving a sharp vertical resistivity measurement based on a horizontal resistivity measurement, a dip measurement, an azimuth measurement, and a conductivity tensor value, derived from the plurality of multiaxial conductivity measurements.

13. The system of claim 12 wherein the plurality of multiaxial conductivity measurements comprise the conductivity tensor value, wherein the conductivity tensor value is selected based at least in part on having a selected sensitivity to vertical resistivity.

14. The system of claim 12, wherein the logging tool comprises a triaxial logging tool comprising at least one triaxial transmitter and at least one triaxial receiver for obtaining the plurality of conductivity measurements, and wherein the plurality of conductivity measurements comprises the conductivity tensor value comprising the measurements $\sigma_{xx}$, $\sigma_{xy}$, $\sigma_{xz}$, $\sigma_{yx}$, $\sigma_{yy}$, $\sigma_{yz}$, $\sigma_{zx}$, $\sigma_{zy}$, and $\sigma_{zz}$ wherein $\sigma$ represents an apparent conductivity and each subscript thereof represents a dipole axis of the at least one transmitter and a dipole axis of the at least one receiver, respectively.

15. The system of claim 14, wherein deriving the sharp vertical resistivity measurement comprises:
   computing the measurement $\sigma_{zz}$ as a function of a ratio (Rv/Rh) indicative of a relationship between vertical resistivity (Rv) and horizontal resistivity (Rh) over a set of points, thereby yielding a $\sigma_{zz}$ function varying based on the vertical resistivity (Rv) and fixed at the horizontal resistivity measurement, the dip measurement, and the azimuth measurement;
   computing the measurement $\sigma_{xx+yy}$ as a function of the ratio (Rv/Rh) over the set of points, thereby yielding a $\sigma_{xx+yy}$ function also varying based on the vertical resistivity (Rv) and fixed at the horizontal resistivity measurement, the dip measurement, and the azimuth measurement;
   computing a derivative of the measurement $\sigma_{zz}$ with respect to the ratio (Rv/Rh) over the set of points; and
   computing a derivative of the measurement $\sigma_{xx+yy}$ with respect to the ratio (Rv/Rh) over the set of points.

16. The system of claim 15, wherein the measurement $\sigma_{zz}$ and the measurement $\sigma_{xx+yy}$ are computed using a uniform anisotropic formation model.

17. The system of claim 16, wherein deriving the sharp vertical resistivity measurement further comprises comparing d($\sigma_{zz}$)/d(Rv/Rh) with d($\sigma_{xx+yy}$)/d(Rv/Rh).

18. The system of claim 17, wherein deriving the sharp vertical resistivity measurement further comprises:
   computing a z-sharpened vertical resistivity ratio using the $\sigma_{zz}$ function; and
   selecting as the sharp vertical resistivity measurement the z-sharpened vertical resistivity ratio times the horizontal resistivity measurement in response to a determination that d($\sigma_{zz}$)/d(Rv/Rh) exceeds d($\sigma_{xx+yy}$)/d(Rv/Rh);
   computing an xy-sharpened vertical resistivity ratio using the $\sigma_{xx+yy}$ function; and
   selecting as the sharp vertical resistivity measurement the xy-sharpened vertical resistivity ratio times the horizontal resistivity measurement in response to a determination that d($\sigma_{xx+yy}$)/d(Rv/Rh) exceeds d($\sigma_{zz}$)/d(Rv/Rh).

* * * * *